(12) United States Patent
Gonsior

(10) Patent No.: US 6,595,489 B2
(45) Date of Patent: Jul. 22, 2003

(54) PACKED SEAL FOR A VALVE

(75) Inventor: Wolfgang Gonsior, Bodolz (DE)

(73) Assignee: Xomox International GmbH & Co., Lindau/Bodensee (DE)

( * ) Notice: Subject to any disclaimer, the term of this patent is extended or adjusted under 35 U.S.C. 154(b) by 0 days.

(21) Appl. No.: 10/269,029

(22) Filed: Oct. 11, 2002

(65) Prior Publication Data

US 2003/0080308 A1 May 1, 2003

Related U.S. Application Data

(63) Continuation of application No. PCT/EP01/03963, filed on Apr. 6, 2001.

(30) Foreign Application Priority Data

Apr. 13, 2000 (DE) ..................................... 200 06 789 U

(51) Int. Cl.$^7$ .............................................. F16K 31/44
(52) U.S. Cl. ........................ 251/214; 137/340; 137/341
(58) Field of Search .......................... 251/214; 137/340, 137/341

(56) References Cited

U.S. PATENT DOCUMENTS

| | | | |
|---|---|---|---|
| 2,029,777 A | | 2/1936 | Kinnaird |
| 2,900,995 A | * | 8/1959 | Dickerson et al. .......... 251/214 |
| 3,977,428 A | | 8/1976 | Schilling |
| 4,281,935 A | * | 8/1981 | Cramer et al. ............... 137/340 |
| 4,353,388 A | * | 10/1982 | Isoyama et al. ............. 251/214 |
| 4,688,594 A | * | 8/1987 | Gardner et al. ............. 137/340 |
| 4,715,400 A | * | 12/1987 | Gardner et al. ............. 137/341 |
| 4,886,241 A | | 12/1989 | Davis et al. |
| 5,915,410 A | * | 6/1999 | Zajac ........................... 137/341 |
| 6,227,236 B1 | * | 5/2001 | Kusumoto et al. .......... 137/341 |
| 6,321,780 B1 | * | 11/2001 | Iwabuchi .................... 137/341 |
| 6,428,121 B1 | | 8/2002 | Dinkel et al. |

FOREIGN PATENT DOCUMENTS

| | | |
|---|---|---|
| DE | GM 1890467 | 4/1964 |
| DE | GM 7028850 | 3/1971 |
| DE | 19920171 | 5/1999 |
| GB | 2125940 | 7/1983 |
| GB | 2135027 | 2/1984 |

OTHER PUBLICATIONS

Schoeffler et al., "Packungsstopfbuchsen in Heisswasser-Umwaelzpumpen," *Technische Rundshau Sulzer*, Mar. 1981 pp. 99–103.

Pp. 8 and 9 of the brochure by Reinhold Kraus entitled "Optimierung von Stopfbuchsen fuer Armaturen" (Optimization of packed seals for valves) published by Feodor Burgmann Dichtungswerke GmbH & Co. of Wolfratshausesn, Germany dated Sep. 1982.

Copy of International Search Report.

* cited by examiner

*Primary Examiner*—Ehud Gartenberg
*Assistant Examiner*—John Bastianelli
(74) *Attorney, Agent, or Firm*—Crowell & Moring LLP

(57) ABSTRACT

A valve that includes a piston (2) linked with a valve body (8) and received in a housing (4), and a packed seal (14) interposed between the piston (2) and the housing (4). Packed seals of valves used for media having high melting points and operating at temperatures close to the melting points risk damage from so-called freezing medium due to the adhesive properties of the medium at temperatures below the melting point. The structure of the valve of the invention is improved by simple measures such that the material of the packed seal reliably operates in the temperature range at which the medium is liquid. The housing (4) is provided with a heating device (16) in the area of the packed seal (14). The axial length of the heating device (16) is longer than that of the packed seal (14) so that the heating device protrudes axially beyond an axial end (22) of the packed seal (16) by a predetermined length (24, 28).

24 Claims, 1 Drawing Sheet

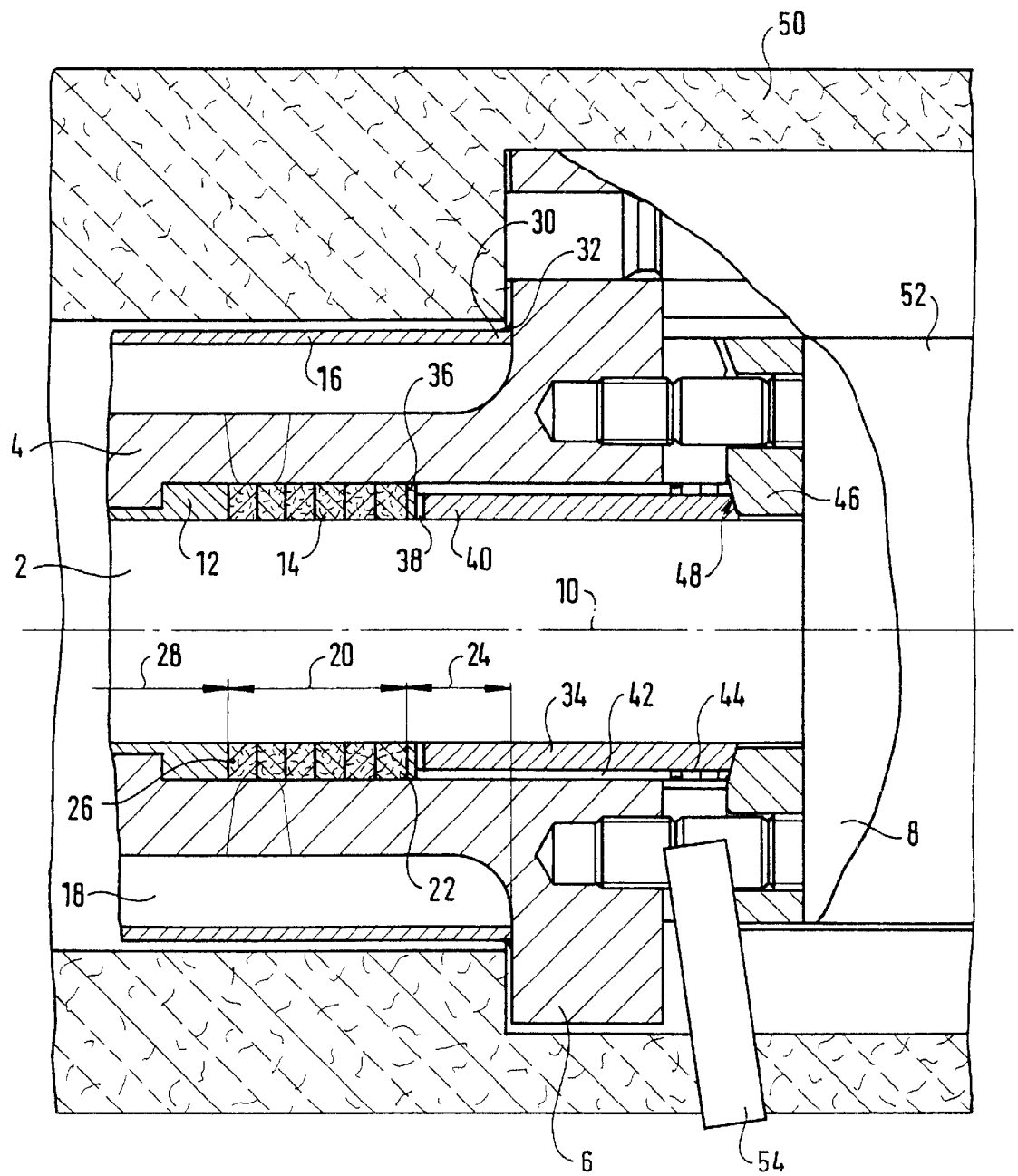

PACKED SEAL FOR A VALVE

CROSS REFERENCE TO RELATED APPLICATIONS

This application is a continuation of international patent application no. PCT/EP01/03963, filed Apr. 6, 2001, designating the United States of America and published in German as WO 01/79735, the entire disclosure of which is incorporated herein by reference. Priority is claimed based on Federal Republic of Germany patent application no. DE 200 06 789.3, filed Apr. 13, 2000.

BACKGROUND OF THE INVENTION

The invention relates to a valve with a packed seal. Davis et al., U.S. Pat. No. 4,886,241 describes such a valve with a packed seal, which is arranged between the housing and the piston connected with the housing and axially displaceable or rotatable within the housing. In valves for media with a high melting point, which operate near the melting point, there is a risk of damaging the packed seal due to "freezing" of the medium as a result of the adhesive properties of the medium in temperature ranges below the melting point. In principle, these problems can be counteracted by heating the housing, but the measures required for this have thus far been relatively complex and costly.

SUMMARY OF THE INVENTION

Accordingly, it is an object of the invention to provide a reliable packed seal valve structure with low design complexity.

Another object of the invention is to provide a packed seal valve in which the packed seal operates reliably within the temperature range at which the medium is liquid.

A further object of the invention is to provide a simply constructed valve in which, despite its simple construction, the packed seal material is protected from the freezing point and the temperature of the packed seal reliably remains in the liquid range above the melting point of the medium flowing through the valve.

These and other objects are achieved in accordance with the claimed invention by providing a valve comprising a piston connected with a valve body and supported in a housing, and a packed seal arranged between the piston and the housing, wherein the housing is provided in the area of the packed seal with a heating device having an axial length is greater than that of the packed seal, and wherein the heating device protrudes axially beyond at least one axial end of the packed seal by a predetermined length.

The proposed valve with a packed seal is distinguished by its functionally reliable construction and ensures with high reliability that the temperature of the packed seal is always within the liquid range above the melting point of the medium. In the area of the packed seal, the housing comprises a heating device having an axial length which is greater by a predefined amount than the length of the packed seal. At least one end, and desirably both ends, of the heating device will protrude beyond the packed seal in a predefined area. Advantageously, the heating device will protrude beyond the end of the packed seal by a length of 30 to 60 mm.

The heating device advantageously comprises a heating jacket surrounding the exterior of the housing. A gap for a heating medium, particularly a heatable heat transfer fluid, is thus provided between the housing and the heating jacket. Alternatively, within the scope of the invention, the heating device can comprise tubes through which a heating medium flows, or an electrical heating coil or the like, which are arranged especially on the exterior surface of the housing in the area of the packed seal.

Furthermore, in the area of the packed seal and a support bushing adjacent to the packed seal, the piston is advantageously designed to have a constant diameter, where no recesses, annular collars or the like are present. Particularly advantageously, the support bushing, which is provided for guiding the piston, is designed with very tight tolerances relative to the housing on the one hand and the piston on the other hand. This is particularly important for sensitive media, which are subject to change as a function of temperature and/or retention time, especially since the selected tolerance affects the quality of sensitive media.

In view of the tolerances necessary for the required quality of the medium, the material of the support bushing according to the invention has at least approximately the same thermal expansion characteristics as the material of the housing and/or the piston. In addition, the piston guide is advantageously substantially harder than the housing and/or the piston material in order to prevent "corrosion" or "wear" in the guide for the piston. Within the scope of the invention, the tolerances are preferably in the range of 0.01 mm to 0.2 mm, particularly preferably about 0.05 mm.

Further developments and special embodiments of the invention are set forth hereinafter.

BRIEF DESCRIPTION OF THE DRAWING

The invention will be described in further detail hereinafter with reference to an illustrative preferred embodiment shown in the accompanying drawing, which is a sectional view of a portion of a valve with a packed seal seal according to the invention.

DETAILED DESCRIPTION OF PREFERRED EMBODIMENTS

The FIGURE shows a partial sectional view of a valve according to the invention in an axial section plane, namely in the area where a piston 2 passes through a housing 4, which in turn is provided with a mounting flange 6. Piston 2 and a valve body 8 that is connected therewith and that is configured, for instance, as a shut-off valve and/or a control valve, are axially displaceable or rotatable about a longitudinal axis 10. A support bushing 12 is provided between the cylindrical inner surface of housing 4 and the outer surface of piston 2. Axially adjacent to the support bushing 12, a packed seal 14 or a packed seal packing with a plurality of sealing rings is provided.

Piston 2 has a constant outside diameter in axial direction at least in the area of packed seal 14, preferably also in the area of support bushing 12. The material of the packed seal or its rings is selected taking into account the thermal and mechanical load. The packed seal is configured in such a way that sliding and strength-imparting sealing materials are combined. Depending on the temperatures to be withstood by the valve, sealing materials with and/or without fabric inserts may be used. Through the number of the sealing rings, an adaptation to the pressure to be controlled by the valve is effected.

The piston guide or support bushing 12 is manufactured with very tight tolerances relative to piston 2 on the one hand and relative to housing 4 on the other hand. These tolerances, in particular, are preferably in the range of 0.01 mm to 0.2 mm and especially preferably are about 0.05 mm.

Moreover, the material of the support bushing 12 has substantially the same thermal expansion characteristics as the material of piston 2 and/or housing 4.

In accordance with the invention, housing 4, which receives support bushing 12 and packed seal 14, has a substantial axial length and is provided with a heating device 16. Heating device 16 advantageously comprises a heating jacket, which according to the invention surrounds the long housing 4. As may be seen, a preferably annular gap 18, through which a heatable heat transfer medium can flow, is thereby provided between the preferably cylindrical heating device or heating jacket 16 and the housing 4.

The packed seal 14 has an axial length 20. Particularly advantageously the heating device 16 has a substantially greater axial length than the packed seal 14 and protrudes beyond at least one end of the packed seal (in the drawing the right end 22) by a defined length 24, which preferably ranges between 30 and 60 mm. The heating device 16 also protrudes beyond the second packed seal end 26 by a defined length 28.

According to the invention the temperature of the heating device or the heating medium in gap 18 is selected such that the temperature of the packed seal is reliably within the liquid range of the medium flowing through the valve. Particularly advantageously the end 30 of heating jacket 16 closest to valve body 8 is connected with mounting flange 6 of housing 4 by a weld seam 32. As may be seen, gap 18 is therefore also substantially longer than packed seal 14 whose temperature is thus always reliably within the liquid range above the melting point of the medium.

Between packed seal 14—also referred to as a packing—and a pressure sleeve or packing pressure sleeve 34, a pressure distribution ring 36 is arranged to ensure uniform transfer of the pressure from the pressure sleeve to the packing. The end of pressure sleeve or pressure ring 34 facing toward the packed seal 14, comprises at least one radial relief bore 38 through which any liquid medium flowing out of the packed seal is conveyed to the outside of pressure sleeve 34, where premature freezing of the medium is prevented by the action of the heating device. Although the relatively large or long piston 2 removes a lot of heat, due to the heating device there is no risk that the medium will freeze along the outer circumference of the pressure sleeve 34. The packed seal or packing 14 is compressed by the pressure sleeve 34, and the necessary initial compression is thereby applied to ensure proper sealing of the valve system.

According to the invention, pressure sleeve 34 extends axially far enough into the heated area and/or the heating device 22 that cooling of the packed seal 14 is avoided. As may be seen, the end of pressure sleeve 34 facing toward packed seal 14 extends into the heated area by a defined length 24 as explained above. Since heat loss is to a significant extent caused by the piston of the valve, end 40 of pressure sleeve 34, which protrudes into the area of the heating device, is particularly important in maintaining the medium in its liquid state.

It should be noted here that the durability of the packed seal packing depends on the liquid state to a significant extent. For this reason tolerances advantageously are prescribed for pressure sleeve 34 relative to the housing side on the one hand and to the piston on the other hand. The tolerances relative to the housing side range from 0.05 mm to 0.2 mm and are preferably on the order of magnitude of 0.08 mm to ensure the supply of heat. The tolerances between pressure sleeve 34 and piston 2 must ensure mobility on the one hand and take into account heat removal via piston 2 one the other hand. They range between 0.05 and 0.4 mm, and are preferably on the order of magnitude of 0.1 mm.

Furthermore, relief grooves 42, which advantageously are axial grooves, are preferably provided on the outside of pressure sleeve 34 to carry away the medium in the axial direction. The number of these longitudinal grooves 42 is defined between 1 and 8, preferably between 2 and 4. Since the grooves may interfere with the heat transport of heating device 16, their number should be minimized.

In addition, radial service grooves 44 are provided on the pressure-flange-side of pressure sleeve 34 and are used to monitor packed seal packing 14 and/or to engage with a tool. By means of the last groove it can be decided whether to tighten or replace the packing. The radial service grooves are particularly important for the detachability of the pressure sleeve 34. The number of the radial grooves 44 is, in particular, 2 to 6, preferably 2 to 4.

To avoid any undesired heat loss, a heat barrier 48 is provided between pressure sleeve 34 and a pressure plate 46.

Preferably, insulation 50 is provided surrounding the valve housing at least in the area of piston 2 to prevent heat losses. In order to assure that heat losses through the piston 2, the pressure sleeve or pressure ring 34 and a rod assembly of a drive (not shown) do not cause the medium in the packed seal to freeze, the working chamber of piston 2 is advantageously also surrounded by insulation 50. This makes it possible to reduce the freezing range of the medium to a sufficient extent that it cannot have a negative influence on the driving forces.

In addition, a piston protection element 52 is provided to prevent contamination on the one hand and minimize heat losses on the other. To that extent care must be taken during manufacture to avoid a chimney effect. In addition, piston protection element 52 is configured in such a way that the moving part is protected against the medium draining from the packed seal. The piston protection element is furthermore configured in such a way that the medium portion which flows therethrough can flow away in a downward direction. Moreover, piston protection element 52 protects against contact, so that nobody can get pinched in the movable part.

Finally, a medium outlet 54 is provided, which points downwardly from the area of packed seal 14. It should be noted that when the valve is installed, the longitudinal axis 10 extends substantially vertically and medium outlet 54 is located below the packed seal 14. This downwardly directed medium outlet 54 prevents contamination of the part of insulation 50 that is located below it.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations falling within the scope of the appended claims and equivalents thereof.

What is claimed is:

1. A valve comprising a piston connected with a valve body and supported in a housing, and a packed seal arranged between said piston and said housing, wherein the housing is provided in the area of the packed seal with a heating device having an axial length is greater than that of the packed seal, and wherein said heating device protrudes axially beyond at least one axial end of the packed seal by a predetermined length.

2. A valve according to claim 1, wherein the housing in which the packed seal is received is greater in length than the packed seal by a predetermined amount.

3. A valve according to claim 1, wherein a pressure ring associated with the packed seal and surrounding the piston axially protrudes with one end into the area of the heating device.

4. A valve according to claim 1, wherein the heating device comprises a heating jacket which surrounds the housing and which forms a gap through which a heat transfer medium can flow.

5. A valve according to claim 4, wherein the heating jacket is connected with the housing.

6. A valve according to claim 5, wherein the heating jacket is connected with a mounting flange of the housing.

7. A valve according to claim 5, wherein the heating jacket is connected to the housing by a weld seam.

8. A valve according to claim 1, wherein the support bushing has tolerances in the range of 0.01 mm to 0.2 mm relative to the piston or the housing or both.

9. A valve according to claim 8, wherein said tolerances are about 0.05 mm.

10. A valve according to claim 1, wherein the support bushing has thermal expansion characteristics substantially equal to the piston or the housing or both.

11. A valve according to claim 1, wherein the support bushing at least at surfaces bounding the piston or the housing or both, has a greater surface hardness than either the piston or the housing.

12. A valve according to claim 1, wherein a pressure ring or a packing pressure sleeve associated with the packing or the packed seal has tolerances relative to the housing in the range of 0.05 to 0.2 mm.

13. A valve according to claim 12, wherein said pressure ring or packing pressure sleeve has tolerances relative to the housing of about 0.08 mm.

14. A valve according to claim 1, wherein a pressure ring or packing pressure sleeve associated with the packing or the packed seal has tolerances relative to the piston in the range of 0.05 to 0.4 mm.

15. A valve according to claim 14, wherein said pressure ring or packing pressure sleeve has tolerances relative to the piston of about 0.1 mm.

16. A valve according to claim 1, wherein the pressure ring or the packing sleeve is provided with at least one relief groove along its exterior.

17. A valve according to claim 16, wherein the pressure ring or packing sleeve is provided with up to 8 relief grooves.

18. A valve according to claim 17, wherein the pressure ring or packing sleeve is provided with from 2 to 4 relief grooves.

19. A valve according to claim 16, wherein said relief grooves are axial grooves.

20. A valve according to claim 1, wherein a side of the pressure ring or the packing pressure sleeve facing away from the packed seal is provided with at least one substantially radial service groove.

21. A valve according to claim 20, wherein the pressure ring or packing pressure sleeve is provided with from 2 to 6 substantially radial service grooves.

22. A valve according to claim 21, wherein the pressure ring or packing pressure sleeve is provided with from 2 to 4 substantially radial service grooves.

23. A valve according to claim 1, wherein the housing is provided with exterior insulation in the area of the packed seal or the heating device or both.

24. A valve according to claim 23, wherein said insulation is also provided surrounding the working chamber of the piston.

* * * * *